(12) United States Patent
Larequi et al.

(10) Patent No.: US 9,393,943 B2
(45) Date of Patent: Jul. 19, 2016

(54) BRAKE BOOSTER WITH POSITION-DEPENDENT PRESSURE EQUALIZATION

(75) Inventors: David Lopez Larequi, Koblenz (DE); Hans Martin Giese, Polch (DE)

(73) Assignee: Lucas Automotive GmbH, Koblenz (DE)

( * ) Notice: Subject to any disclaimer, the term of this patent is extended or adjusted under 35 U.S.C. 154(b) by 410 days.

(21) Appl. No.: 14/111,049

(22) PCT Filed: Mar. 28, 2012

(86) PCT No.: PCT/EP2012/001371
§ 371 (c)(1),
(2), (4) Date: Nov. 27, 2013

(87) PCT Pub. No.: WO2012/139709
PCT Pub. Date: Oct. 18, 2012

(65) Prior Publication Data
US 2014/0026556 A1    Jan. 30, 2014

(30) Foreign Application Priority Data

Apr. 12, 2011   (DE) .......................... 10 2011 016 830

(51) Int. Cl.
*F15B 9/12* (2006.01)
*B60T 13/58* (2006.01)
*B60T 13/57* (2006.01)

(52) U.S. Cl.
CPC *B60T 13/58* (2013.01); *B60T 13/57* (2013.01)

(58) Field of Classification Search
CPC ................................. B60T 13/57; B60T 13/58
USPC .................... 91/376 R, 368, 369.1, 369.3
See application file for complete search history.

(56) References Cited

U.S. PATENT DOCUMENTS 5,476,029 A * 12/1995 Ando .................... B60T 13/57
                                                            91/32
5,546,846 A   8/1996 Bauer
(Continued)

FOREIGN PATENT DOCUMENTS

DE       4227879 A1    2/1994
DE       4441149 A1    5/1996
(Continued)

OTHER PUBLICATIONS

International Search Report for International Application No. PCT/EP2012/001371 dated Jul. 12, 2012.

*Primary Examiner* — Nathaniel Wiehe
*Assistant Examiner* — Dustin T Nguyen
(74) *Attorney, Agent, or Firm* — MacMillan, Sobanski & Todd, LLC

(57) ABSTRACT

A brake booster is provided having a force input element that is or can be connected to a brake pedal, a chamber arrangement with a working chamber and a vacuum chamber, and a control device with a control valve. The working chamber is selectively connected to the vacuum chamber or to the surrounding atmosphere as a result of a displacement of the force input element. The control valve has a valve element that is selectively prestressed into sealed abutment on a first valve seat provided on the control valve housing or into sealed abutment on a second valve seat provided on the control piston of the control valve by a tension spring. In order to reduce the actuating force, a pneumatic function chamber is selectively isolated from the surrounding atmosphere by the valve element or connected to the vacuum chamber or to the surrounding atmosphere by the force input element.

13 Claims, 2 Drawing Sheets

(56) References Cited

U.S. PATENT DOCUMENTS

| | | |
|---|---|---|
| 5,564,325 A | 10/1996 | Saton |
| 5,657,680 A | 8/1997 | Gautier et al. |
| 6,367,364 B1 * | 4/2002 | Kramer .................. B60T 13/57 91/376 R |
| 6,718,863 B2 | 4/2004 | Shinohara |
| 7,066,073 B1 | 6/2006 | Wagner |
| 2010/0269684 A1 | 10/2010 | Schlüter |

FOREIGN PATENT DOCUMENTS

| | | |
|---|---|---|
| DE | 102007049122 A1 | 4/2009 |
| EP | 0802870 B1 | 9/1999 |
| EP | 0743908 B1 | 3/2000 |
| EP | 1053154 B1 | 5/2002 |
| EP | 0950595 B1 | 2/2004 |
| EP | 1216906 B1 | 3/2005 |

\* cited by examiner

BRAKE BOOSTER WITH POSITION-DEPENDENT PRESSURE EQUALIZATION

CROSS-REFERENCE TO RELATED APPLICATIONS

This application is a national stage of International Application No. PCT/EP2012/001371 filed Mar. 28, 2012, the disclosures of which are incorporated herein by reference in entirety, and which claimed priority to German Patent Application No. DE 10 2011 016 830.3 filed Apr. 12, 2011, the disclosures of which are incorporated herein by reference in entirety.

BACKGROUND OF THE INVENTION

The present invention relates to a brake booster with position-dependent pressure equalization for a motor vehicle brake system, comprising a force input element that is or can be connected to a brake pedal, a chamber arrangement with a working chamber and a vacuum chamber that are separated from one another by a movable wall, and a control device with a control valve, by means of which the working chamber can be optionally connected to the vacuum chamber or to the surrounding atmosphere as a result of a displacement of the force input element, wherein the control valve has a control valve housing, which is coupled to the movable wall and in which the force input element is guided in a displaceable manner against the action of a return spring together with a control piston, and wherein the control piston further comprises a valve element that is optionally prestressed into sealed abutment on a first valve seat provided on the control valve housing or into sealed abutment on a second valve seat provided on the control piston of the control valve by means of a tension spring.

Such brake boosters are prior art. Thus, for example the document DE 42 27 879 A1, and corresponding U.S. Pat. No. 5,546,846 A, both of which are incorporated by reference herein in entirety, discloses such a brake booster. With this in a known manner an actuating force exerted via a force input element is transmitted to a control piston, on which a sealing seat between the working chamber and the surrounding atmosphere is mounted. As a result of actuation of the force input element and, with it, the control piston this sealing seat is lifted off the valve element, thereby resulting in a fluid connection between the surrounding atmosphere and the working chamber. An excess pressure accordingly builds up in the working chamber compared to the vacuum chamber, acts upon the movable wall and in order to assist the actuating force displaces the control valve housing until a state of equilibrium develops in the advanced position of the control valve housing and both valve seats move back into abutment on the valve element. Once the force input element is released by reducing a pedal actuating force, the valve element is pushed back by the control piston under the action of a return spring, so that the second sealing seat between working chamber and surrounding atmosphere opens and a pressure equalization may occur at the movable wall. As soon as the pressure equalization has occurred, the initial state is restored. In order to guarantee a reliable mode of operation, the valve element is prestressed by means of a tension spring in such a way that its sealing surface is biased towards the two valve seats. This means however that for the previously described return movement after release of the brake pedal the return spring has to exert a high enough force to overcome also the prestressing force of the tension spring at the valve element that counteracts this force.

It has been shown in the past and was accordingly realized in the previously cited document DE 42 27 879 A1 that it may be advantageous if the valve element is relieved from pressure. By means of such a pressure relief the effect may be achieved that the response behaviour but also the return movement are not hindered by unwanted differential pressures at the valve element. For this reason the previously cited document DE 42 27 879 A1 provides that in the valve element a plurality of pressure-equalizing openings are provided, which enable a permanent pressure equalization between both sides of the valve element.

Similar solutions are to be found in a large number of documents relating to the background art, such as for example in the document DE 44 41 149 A1, and corresponding U.S. Pat. No. 7,066,073 B1, both of which are incorporated by reference herein in entirety, the document EP 0 802 870 B1, and corresponding U.S. Pat. No. 5,657,680 A, both of which are incorporated by reference herein in entirety, and the document EP 0 950 595 B1. The document U.S. Pat. No. 5,564,325 also discloses a form of construction, in which a permanent pressure equalization at the valve element occurs by means of a connection opening.

BRIEF SUMMARY OF THE INVENTION

It is accordingly a feature of the present invention to provide a brake booster of the type described in the introduction, in which in dependence upon the operating situation in an advantageous manner a pressure equalization may occur, in specific operating situations however a differential pressure is maintained at the valve element in order to assist the mode of operation of the brake booster.

This feature is achieved by a brake booster of the type described in the introduction, in which it is provided that a pneumatic function chamber can be closed in a sealing manner by means of the valve element and can be optionally connected to the vacuum chamber or to the surrounding atmosphere according to a current actuating position of the force input element.

In a departure from the previously described prior art, the present invention utilizes the ostensible drawback of a not always pressure-equalized pneumatic function chamber at the valve element in an advantageous manner and dispenses with a permanent pressure equalization at the valve element through the provision of a permanently open pressure-equalizing opening. Instead, the present invention purposefully selectively utilizes a pressure difference at the valve element in dependence upon the current actuating position of the brake booster. In this way the effect may be achieved that the valve element in specific operating situations is assisted in its sealing function. For example, if in the vacuum chamber and in the working chamber there is a pressure that is reduced compared to the atmospheric pressure, the valve element is pressed by atmospheric pressure against the sealing seats and hence increases the sealing effect. These pressure-related components of the sealing effect allow the tension spring, which is actually provided for this purpose of prestressing the sealing element against the valve seats, to be of a weaker design than in the case of a permanently pressure-relieved valve element according to the prior art. In other words, the excess pressure that prevails in the pneumatic function chamber on the valve element and is greater than the vacuum prevailing in the initial state in the working chamber and in the vacuum chamber, undertakes some of the press-on action in order to increase the sealing effect between the sealing seats and the sealing surface on the valve element.

The weaker design of the tension spring in turn has the advantage that the return spring, which is needed to reset the force input element together with the actuating piston against the action of the tension spring upon release of the brake pedal, may likewise be of a weaker design because a correspondingly reduced spring action of the weaker return spring is to be overcome. This return spring however upon an actuation provides a resistance force that a driver has to overcome by means of the pedal actuation. Given an accordingly correspondingly weaker return spring this actuating force is likewise lower. Altogether, therefore, as a result of purposefully selective utilization of a pressure prevailing in the pneumatic function chamber the tension spring that acts upon the valve element and hence the return spring that overcomes the resistance force of the tension spring in the resetting situation may be of a weaker design, this benefiting the driver because he accordingly also has to summon up only a lower actuating force for the same braking effect than is the case with the prior art.

According to a development of the invention it is provided that the tension spring is at least partially accommodated in the pneumatic function chamber. This means that the pneumatic function chamber may also be utilized in a space-saving manner to accommodate the return spring. The return spring in this case is supported by one end against the valve element and by its other end directly or via an interposed component against the control valve housing.

A development of the invention provides that the valve element comprises at least one valve portion, which in accordance with a current actuating position either pneumatically seals or provides a passage of fluid. The valve element may therefore be moved selectively into a state, in which actually seals and hence locks off the pneumatic function chamber according to the above description so that a pressure difference prevailing therein may be utilized, or into a state, in which it enables a passage of fluid for a pressure equalization. In particular, in this connection it is provided that that the valve element comprises a first valve portion, which in a first operating position provides a passage of fluid for the fluid connection of the pneumatic function chamber to the surrounding atmosphere and which in a second operating position isolates the pneumatic function chamber from the surrounding atmosphere. A development in this connection further provides that the valve element comprises a second valve portion, which in the first operating position isolates the pneumatic function chamber from the vacuum chamber and in the second operating position connects the pneumatic function chamber to the vacuum chamber. In this case, according to the invention it may be provided that in the first operating position the brake booster is situated in the initial state or in an activated state as a result of actuation of the force input element and that in the second actuating position the brake booster is situated in a release state, in which it returns from the activated state to the initial state. In other words, according to the invention it may be provided that in the initial position, i.e. in the non-actuated state of the brake pedal and the force input element accordingly in an initial position, atmospheric pressure prevails in the pneumatic function chamber because the valve element in this initial position seals off the pneumatic function chamber from the working chamber and the vacuum chamber but provides a fluid connection between the surrounding atmosphere and the pneumatic function chamber. If as a result of actuating the brake pedal the force input element is displaced so that the brake booster in an, as it were, activated state comes into operation to boost the actuating force, this has the result that, as mentioned in the introduction, a fluid connection is established between the working chamber and the surrounding atmosphere in order to build up pressure in the working chamber compared to the vacuum chamber. In this actuating position atmospheric pressure still prevails in the pneumatic function chamber at the valve element and presses the valve element against the sealing seat on the control valve housing in order to seal off the vacuum chamber. Also in a state of equilibrium, which sets in once the movable wall together with the control valve housing has been advanced and both valve seats once more, in the depressed state of the brake pedal, lie against the valve element, atmospheric pressure prevails in the pneumatic function chamber as a result of a corresponding connection via the first valve portion.

If however the brake pedal is released so that the force input element moves under the action of the return spring back in the direction of its initial position, then the valve element is moved back by the control piston, wherein the first valve portion moves into its second actuating position, in which it isolates the pneumatic function chamber from the surrounding atmosphere. In the course of this movement the second valve portion is transferred, as it were, into the second actuating position, in which it connects the pneumatic function chamber to the vacuum chamber. This leads to a pressure equalization between the vacuum chamber and the pneumatic function chamber, i.e. a lower pressure than the atmospheric pressure prevails in the pneumatic function chamber. This in turn means that the backward movement, which is caused by the return spring after release of the brake pedal, does not have to be effected against an excess pressure in the pneumatic function chamber as the pneumatic function chamber is pressure-equalized with the vacuum chamber.

In other words, therefore, in the initial position and upon an actuation of the brake booster the pneumatic function chamber is used as an excess pressure chamber, so that the excess pressure prevailing in the pneumatic function chamber compared to the pressure prevailing in the working chamber and/or the vacuum chamber additionally provides a sealed abutment of the valve element on the sealing seats. This excess pressure makes it possible for the tension spring at the valve element to be of a weaker design. In the course of the resetting, as a result of the then purposefully effected pressure equalization only a lower spring action of the correspondingly weaker tension spring has to be overcome, thereby making it possible to use an, as it were, weaker return spring.

As regards the mechanical construction of the valve element it may be provided that in order to form the at least one valve portion it is configured with at least one sealing lip, which slides in a sealing manner along a corresponding contact surface on the control valve housing or on a component coupled to the control valve housing, wherein the contact surface has at least one local passage region, which in accordance with the position of the sealing lip enables a passage of fluid. The respective sealing lip effects reliable sealing by interacting with the corresponding contact surface on the control valve housing or on the component coupled thereto. However as soon as the valve element slides with its at least one sealing lip along the contact surface into the local passage region, the sealing effect is cancelled and a fluid connection arises. In this case it may be provided that the at least one local passage region is configured in the form of local recesses or local projections on the control valve housing or on the component coupled to the control valve housing. The fluid connection is therefore established by creating local bypass channels that allow an air flow past the respective sealing lip.

A development of the invention provides that the component coupled to the control valve housing is formed by a sealing ring that is fixed therein. This sealing ring may be subsequently fitted in a sealing manner, thereby simplifying assembly. In an advantageous manner the tension spring is supported also against this sealing ring. Furthermore, as indicated above, a contact surface may be formed on this sealing ring.

A development of the invention provides that the valve element in cross section has a U-shaped profile, wherein on each U-limb, preferably on the free end thereof, a sealing lip is provided. In this case the valve element as a whole has an annular configuration, wherein a cross section reveals the U-shaped profile.

According to the invention it may further be provided that the valve element has a sealing surface that may be moved sealingly into interaction with the first and second sealing seat. This sealing surface is provided for example on the end face of the transverse U-limb.

The invention further relates to a method of actuating a brake booster in the previously described manner, wherein the sealing surface is provided on the transverse U-limb. The method according to the invention is characterized, as already explained above with regard to the brake booster according to the invention, by the selective utilization of an excess pressure in the pneumatic function chamber and a differential pressure resulting therefrom at the valve element.

Other advantages of this invention will become apparent to those skilled in the art from the following detailed description of the preferred embodiment, when read in light of the accompanying drawings.

DETAILED DESCRIPTION OF THE INVENTION

Figure 1:
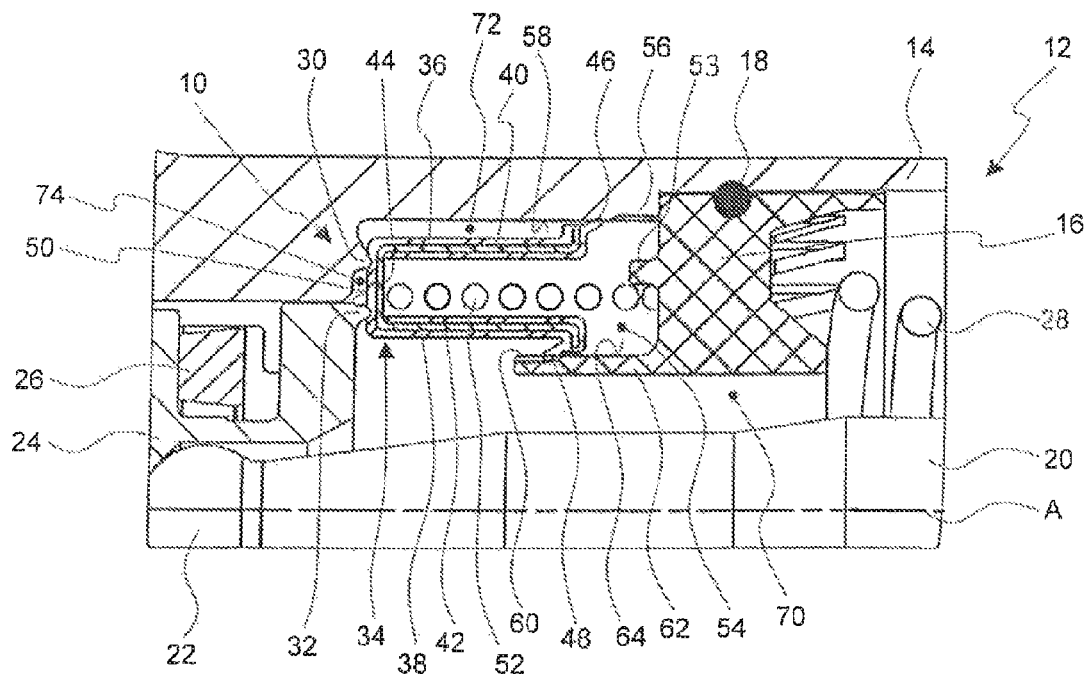
FIG. 1 is a detail of a brake booster according to the invention in a longitudinal sectional view while the brake booster is situated in the non-actuated initial position.
Figure 2:
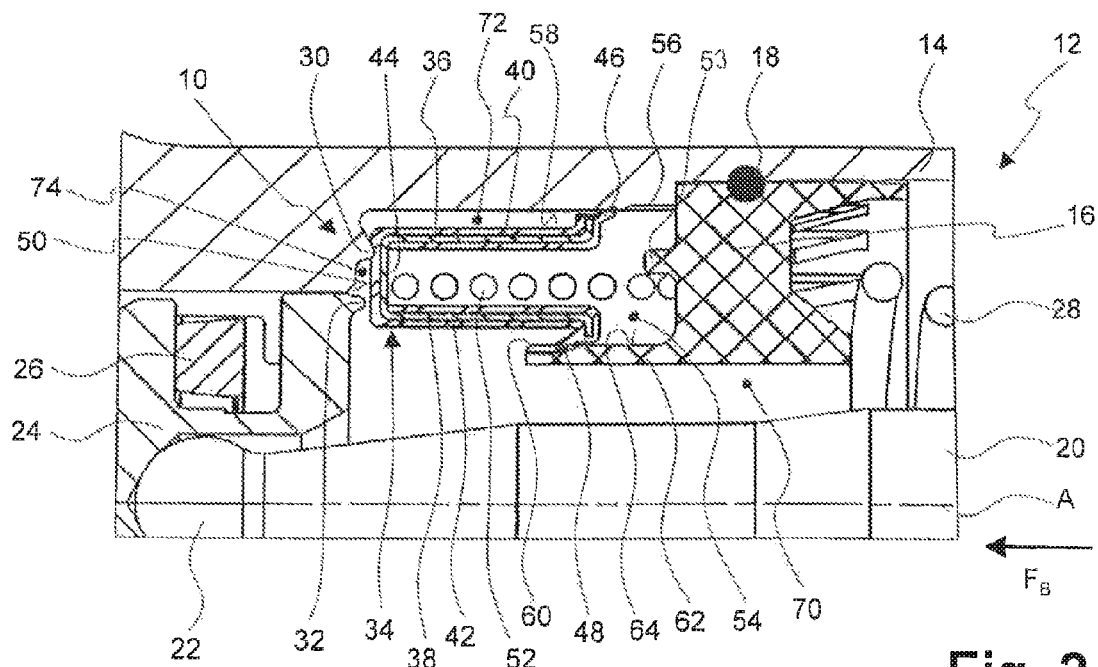
FIG. 2 is a view corresponding to FIG. 1 in a position, in which the force input element has been actuated as a result of brake pedal actuation.
Figure 3:
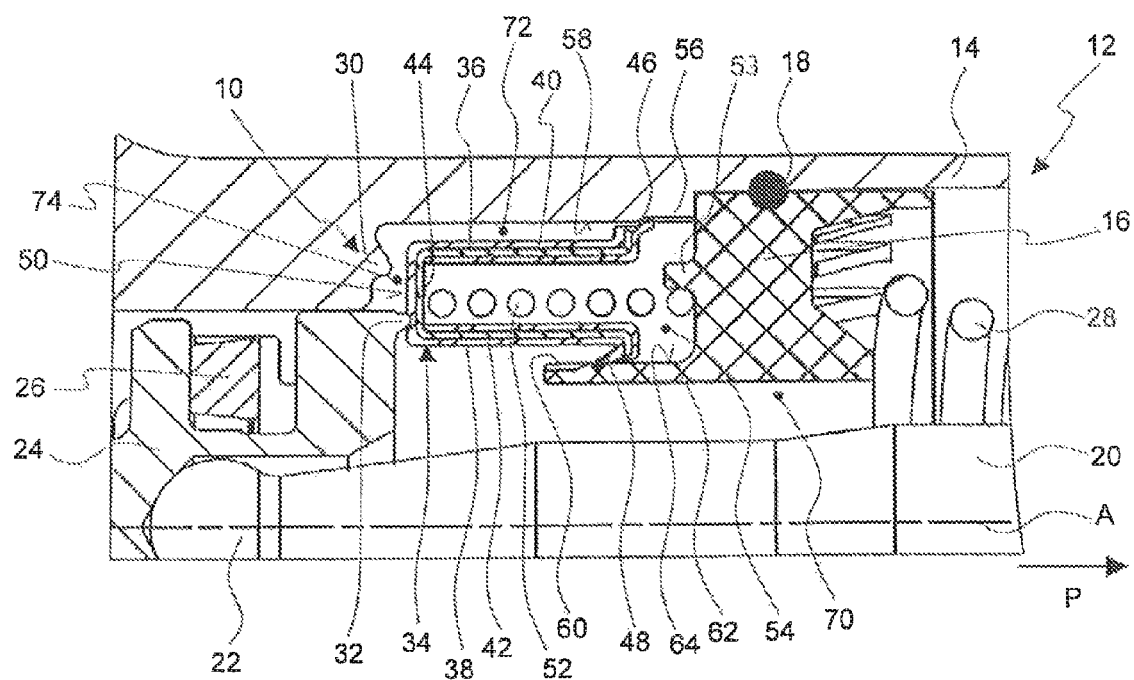
FIG. 3 is a view corresponding to FIGS. 1 and 2, in which the force input element has been released as a result of release of the brake pedal so that it moves back under the action of the return spring.

FIGS. 1 to 3 show a detail of a control valve 10 of a brake booster 12 according to the invention for a motor vehicle brake system.

The basic mode of operation of the brake booster for boosting an actuating force, which is exerted via a brake pedal, by means of a chamber arrangement via a movable wall, at which in dependence upon a current actuation a brake force-assisting pressure difference may be produced, is identical to the conventional mode of operation, such as is known from the prior art, for example from the prior art document cited in the introduction. For this reason the following description will focus on the characteristic features of the brake booster 12, in particular of the control valve 10 of the present invention.

The control valve 10 has a control valve housing 14. On this a retaining ring 16 is fixed and attached sealingly by an annular seal 18. In the control valve housing 14 a force input element 20, which is coupled to a brake pedal, is guided in a displaceable manner. The force input element 20 has a spherical head 22, which is accommodated in a control piston 24 and fixed thereto for joint movement. The control piston 24 has a locking element 26, which delimits the movement of the control piston 24 relative to the control valve housing 14. The force input element 20 is prestressed by a return spring 28 into the initial position shown in FIG. 1 relative to the control valve housing 14. The return spring 28 is supported by one end against the retaining ring 16 and by its other end against a non-illustrated region of the force input element 20. The return spring 28 is of a conical configuration.

Provided on the control valve housing 14 is a first sealing seat 30, which extends in the form of an annular bead in circumferential direction around a longitudinal axis A of the control valve housing. Disposed radially further in on the control piston 24 is a second sealing seat 32, which likewise extends around the longitudinal axis A in the form of an annular bead. In the region close to the sealing seats 30, 32 a valve element 34 is further provided. It is of an annular construction and extends in circumferential direction about the longitudinal axis A. It has a U-shaped profile in the section shown in FIG. 1. The valve element 34 comprises an annular sheet-metal part 36 with a corresponding U-profile, which is surrounded by a rubber-elastic layer 38. The valve element 34 in the sectional view according to FIGS. 1 to 3 comprises a radially outer longitudinal limb 40 and a radially inner longitudinal limb 42 as well as a transverse limb 44. On each of the free ends of the two longitudinal limbs 40 and 42 a sealing lip 46, 48 is provided. The transverse limb 44 at its, in FIGS. 1 to 3 left-facing, end face forms a sealing surface 50, which may be moved into fluid-tight abutment on the two sealing seats 30 and 32. Further evident is a tension spring 52, which is supported by its one end against the retaining ring 16 and positioned against the retaining ring 16 by means of an annular projection 53, and which with its other end presses the valve element 34 in the direction of the two sealing seats 30 and 32.

The valve element 34 is displaceable under and/or against the action of the tension spring 52 in the direction of the longitudinal axis A relative to the control valve housing 14. The valve element 34 together with the control valve housing 14 and the retaining ring 16 encloses a pneumatic function chamber 54. In this pneumatic function chamber 54 the tension spring 52 is accommodated.

From FIG. 1 it is further evident that in the control valve housing 14 close to the contact region of the retaining ring 16 local slot-like recesses 56 are provided. These are distributed evenly over the circumference and incorporated into the inner circumferential surface 58 of the control valve housing 14. Comparable slot-like recesses 60 are provided on the pipe-portion-like projection 62 of the retaining ring 16. These recesses 60 extend at regular angular distances around the outer circumferential surface 64 of this pipe-like projection 62.

There now follows a detailed description of the mode of operation of the control valve 10 in dependence upon an actuation of the force input element 20. FIG. 1 shows the initial position of the brake booster 12, i.e. a state, in which the brake pedal has not yet been actuated and in which the force input element 20 is in a non-actuated state. In this state atmospheric pressure prevails in a region 70 around the force input element 20 and hence in the region 70 radially inside of the valve element. In a region 72 radially outside of the valve element 34 that is connected to the vacuum chamber, the low pressure (vacuum) present in the vacuum chamber prevails. In a region 74 between the valve seats 30, 32 that is fluidically connected to the working chamber, in this operating state it is likewise substantially a vacuum that prevails. In the initial position the valve element 34 is pressed by the tension spring 52 into abutment on the two valve seats 30, 32. The outer sealing lip 46 lies sealingly against the inner circumferential surface 58 of the control valve housing 14. It is situated outside, i.e. axially advanced relative to the recesses 56.

The inner sealing lip 48, on the other hand, in this initial position is situated in abutment on an outer circumferential surface region of the outer circumferential surface 64, in which the slots 60 are provided. Thus the sealing lip 48 does not seal off the pneumatic function chamber 54 from the chamber 70 that is permanently under atmospheric pressure. Instead, there is a fluid connection between the chamber 70 and the pneumatic function chamber 54. Atmospheric pressure therefore likewise prevails in the pneumatic function chamber 54. This has the effect that, because of the atmospheric pressure that prevails in the pneumatic function chamber 54 and is greater than the low pressure in the region 72 and in the region 74, at the valve element 34 there is a pressure difference, by means of which in addition to the prestressing force of the tension spring 52 the valve element 34 is pressed against the valve seats 30, 32. Crucial for this additional press-on force is the differential pressure between the pneumatic function chamber 54 (atmospheric pressure) and the regions 72, 74 radially outside of the sealing seat 32 that are connected to the vacuum chamber and/or working chamber (vacuum).

FIG. 2 shows an actuating position. As a result of actuating the brake pedal a force $F_B$ is exerted on the force input element 20 so that it advances in the control valve housing 14. Because of the motional coupling to the control piston 24, the control piston 24 likewise moves forward in the direction of the longitudinal axis A, to the left relative to the control valve housing 14. In this case the sealing seat 32 is lifted off the sealing surface 50, thereby resulting in a fluid connection between the chamber 70 and the chamber 74 that is connected to the working chamber. In other words, as a result of lifting of the sealing seat 32 atmospheric pressure builds up in the working chamber via the fluid connection. The sealing seat 30 remains in sealed abutment on the sealing surface 50, with the result that a vacuum still prevails in the region 72 connected to the vacuum chamber. The pneumatic function chamber 54 also remains connected by the slots 60 to the region 70, with the result that atmospheric pressure still prevails in the pneumatic function chamber 54. The radially outer sealing lip 46 still seals off the pneumatic function chamber 54 from the region 72 connected to the vacuum chamber. There is therefore, as before, a pressure difference at the valve element 34 between the pneumatic function chamber 54 and the region 72 connected to the vacuum chamber. This pressure difference (excess pressure in the pneumatic function chamber 54) ensures that the valve element 34 in addition to the action of the tension spring 52 is still pressed into sealed abutment on the sealing seat 30.

This pressure difference between the pneumatic function chamber 54 and the region 72 connected to the vacuum chamber may therefore be used in the just actuated operating position according to FIG. 2 to press the valve element against the sealing seat 30. It should be mentioned that the pressure difference develops an effect only in the effective surface region of the valve element 34 radially outside of the sealing seat 30.

In a known manner the brake booster 12 following an actuation, such as is shown in FIG. 2, responds in such a way that because of the build-up of a differential pressure at the movable wall (not shown) the control valve housing 14 advances in FIG. 2 to the left along the longitudinal axis A. In a corresponding manner the valve element advances and hence follows the movement of the control piston, so that finally in a state of equilibrium the valve element 34 positions itself with its contact surface 50 once more on the sealing seat 50 and closes the sealing seat 50. In this state of equilibrium also an excess pressure prevails in the pneumatic function chamber 54 compared to the vacuum chamber and the region 72 connected thereto. This state of equilibrium exists when a driver for example holds the brake pedal in a specific actuating state and its actuating force is boosted to a constant extent by the brake booster.

If the driver then releases the brake pedal to terminate the braking operation, the force input element 20 moves out of the state according to FIG. 2 and out of the action of the return spring 28 back in the direction of the initial position according to FIG. 1. This resetting operation is shown in FIG. 3.

The return spring 28 expands and presses the force input element 20 to the right along the longitudinal axis A. In this case the valve element 34 is moved against the action of the tension spring 52 in FIG. 3 to the right by the control piston 24 and the sealing seat 32 formed thereon. The control valve housing 14 remains initially in the advanced position according to FIG. 2. In other words, as a result of the resetting movement of the force input element 20 the valve element 14 is therefore displaced to the right relative to the control valve housing 14, wherein the tension spring 52 is compressed under the action of the return spring 28. The sealing seat 30 is consequently lifted off the sealing surface 50, thereby resulting in a fluid connection between the region 72 fluidically connected to the vacuum chamber and the region 74 fluidically connected to the working chamber. As a result a pressure equalization may ensue at the movable wall.

The essential point is however that, as a result of this movement of the force input element 20 and the resultant displacement of the valve element 34 relative to the control valve housing 14, the lower sealing lip 48 is then pushed out of the region of the recesses 60 and moved into sealed abutment on the outer circumferential surface 64 of the retaining ring 16. The pneumatic function chamber 54 is consequently closed in a sealing manner relative to the region 70 and hence relative to the surrounding atmosphere. On the other hand, as a result of the displacement of the valve element 34 the outer sealing lip 46 is pushed out of its sealed abutment on the inner circumferential surface 58 and displaced into the region of the recesses 56. In this region the sealing lip 46 no longer provides a fluid seal between the pneumatic function chamber 54 and the region 72. Instead, a fluid connection is established via the recesses 56 between the pneumatic function chamber 54 and the region 72. The result is accordingly a pressure equalization between the region 72 connected to the vacuum chamber and the pneumatic function chamber 54. This means that immediately upon the resetting movement of the force input element 20 the pneumatic function chamber 54 is relieved of pressure so that, upon displacement of the valve element 34 in FIG. 3 to the right under the action of the return spring 28, only the counterforce of the tension spring 52 has to be counteracted, not however an excess pressure that is present in the pneumatic function chamber 54. In other words, therefore, upon the resetting movement the pneumatic function chamber 54 is relieved of pressure so that after this pressure equalization the excess pressure previously prevailing in this pneumatic function chamber 54 no longer counteracts the resetting movement.

As soon as a corresponding pressure equalization has arisen at the non-illustrated movable wall, the control valve housing 14 moves back under the action of a non-illustrated return spring and positions itself with its sealing seat 30 once more on the sealing surface 50. As a result of this relative movement the tension spring 52 may expand. The brake booster finally adopts the initial position according to FIG. 1.

The above description of the mode of operation of the brake booster according to the invention therefore demonstrates that the pneumatic function chamber 54 in dependence upon the current actuating position of the force input element 20 and hence in dependence upon the current operating position of the valve element 34 may selectively act as a "pressure chamber" relative to the vacuum chamber and the region 72 connected thereto, or may be kept pressure-equalized relative to the region 72 connected to the vacuum chamber. Thus, when it comes to a sealed abutment on the sealing seat 30, it is possible to utilize the excess pressure to maintain this sealed abutment. On the other hand, when a resetting action is to be effected, by means of this mode of operation immediately upon the start of the resetting movement provision is made for a relief of pressure of the pneumatic function chamber 54, with the result that the pressure prevailing therein does not counteract the resetting movement.

The selective utilization of an excess pressure in the pneumatic function chamber 54 to maintain the sealing effect at the sealing seat 30 allows the tension spring as a whole to be of a weaker design than is the case in the prior art, where a volumetric area corresponding to the pneumatic function chamber 54 is permanently relieved of pressure in every actuating position of the force input element. The weaker design of the tension spring 52 that is possible by virtue of the selective utilization according to the invention of the pneumatic function chamber 54 as a pressure chamber in turn enables a weaker design of the return spring 28 because in the situation of the resetting movement the return spring 28 has to overcome a correspondingly weaker counterforce of the weaker tension spring 52. The weaker design of the return spring 28 in turn has the result that, upon an actuation of the brake pedal, in order to deflect the force input element 20 a lower resistance force, namely the correspondingly reduced counterforce of the return spring 28, is to be overcome.

With the invention it is therefore possible, as a result of purposeful selective utilization of the pneumatic function chamber 54, for the tension spring 52 and hence the return spring 28 to be of a weaker design, this as a whole facilitating the actuation of the brake booster compared to the prior art. This advantage is achieved by relatively simple constructional measures at the valve element 34 without substantially altering the basic layout of the brake booster.

In summary, the present invention leads to a brake booster which, compared to the prior art, is considerably improved in terms of its mode of operation and in particular in terms of the force balance.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A brake booster for a motor vehicle brake system, comprising:
   a force input element that is or can be coupled to a brake pedal,
   a chamber arrangement with a working chamber and a vacuum chamber, and
   a control device with a control valve, by means of which the working chamber is selectively connected to the vacuum chamber or to a surrounding atmosphere as a result of a displacement of the force input element,
   wherein the control valve comprises a control valve housing in which the force input element is guided in a displaceable manner against the action of a return spring together with a control piston, and wherein the control valve further comprises a valve element that is selectively prestressed into sealed abutment on a first valve seat provided on the control valve housing and into sealed abutment on a second valve seat provided on the control piston of the control valve by means of a tension spring,
   wherein a pneumatic function chamber is selectively isolated from the surrounding atmosphere in a sealing manner by means of the valve element and is selectively connected to the vacuum chamber or to the surrounding atmosphere according to a current actuating position of the force input element.

2. The brake booster according to claim 1, wherein the tension spring is at least partially accommodated in the pneumatic function chamber.

3. The brake booster according to claim 1,
   wherein the valve element comprises at least one valve portion, which in accordance with the current actuating position pneumatically seals or provides a passage of fluid.

4. The brake booster according to claim 3,
   wherein the valve element comprises a first valve portion, which in a first operating position provides a passage of fluid for the fluid connection of the pneumatic function chamber to the surrounding atmosphere and which in a second operating position isolates the pneumatic function chamber from the surrounding atmosphere.

5. The brake booster according to claim 4,
   wherein the valve element comprises a second valve portion, which in the first operating position isolates the pneumatic function chamber from the vacuum chamber and in the second operating position fluidically connects the pneumatic function chamber to the vacuum chamber.

6. The brake booster according to claim 4,
   wherein in the first operating position the brake booster is situated in an initial state or in an activated state as a result of actuation of the force input element and that in the second operating position the brake booster is situated in a release state, in which the brake booster returns from the activated state to the initial state.

7. A brake booster for a motor vehicle brake system, comprising:
   a force input element that is or can be coupled to a brake pedal,
   a chamber arrangement with a working chamber and a vacuum chamber, and
   a control device with a control valve, by means of which the working chamber is selectively connected to the vacuum chamber or to a surrounding atmosphere as a result of a displacement of the force input element,
   wherein the control valve comprises a control valve housing in which the force input element is guided in a displaceable manner against the action of a return spring together with a control piston,
   wherein the control valve further comprises a valve element that is selectively prestressed into sealed abutment on a first valve seat provided on the control valve housing and into sealed abutment on a second valve seat provided on the control piston of the control valve by means of a tension spring,
   wherein a pneumatic function chamber is selectively closed in a sealing manner by means of the valve element and is selectively connected to the vacuum chamber or to the surrounding atmosphere according to a current actuating position of the force input element, wherein the valve element comprises at least one valve portion, which in accordance with a the current actuating position pneumatically seals or provides a passage of fluid, wherein the valve element in order to form the at least one valve portion is configured with at least one sealing lip, which slides in a sealing manner along a corresponding contact surface on the control valve housing or on a component coupled to the control valve housing, wherein the contact surface has at least one local passage region, which in accordance with the position of the sealing lip enables a passage of fluid.

8. The brake booster according to claim 7,
wherein the at least one passage region is configured in the form of local recesses or local projections on the control valve housing or on a component coupled to the control valve housing.

9. The brake booster according to claim 7,
wherein the component coupled to the control valve housing is formed by a sealing ring that is fixed therein.

10. The brake booster according to claim 1,
wherein the valve element in cross section has a U-shaped profile and includes limbs, wherein on each limb a sealing lip is provided.

11. The brake booster according to claim 1,
wherein the valve element has a sealing surface that is selectively moved sealingly into interaction with the first and second valve seats.

12. The brake booster according to claim 11,
wherein the sealing surface is provided on a transverse limb of the valve element.

13. A method of actuating a brake booster comprising:
providing a brake booster having a force input element that is or can be coupled to a brake pedal, a chamber arrangement with a working chamber and a vacuum chamber, and a control device with a control valve, by means of which the working chamber is selectively connected to the vacuum chamber or to a surrounding atmosphere as a result of a displacement of the force input element, wherein the control valve comprises a control valve housing in which the force input element is guided in a displaceable manner against the action of a return spring together with a control piston, wherein the control valve further comprises a valve element that is selectively prestressed into sealed abutment on a first valve seat provided on the control valve housing and into sealed abutment on a second valve seat provided on the control piston of the control valve by means of a tension spring, wherein a pneumatic function chamber is selectively closed in a sealing manner by means of the valve element and is selectively connected to the vacuum chamber or to the surrounding atmosphere according to a current actuating position of the force input element, wherein the pneumatic function chamber in a non-operated state as well as in an actuated position of the brake booster is fluidically connected to the surrounding atmosphere and is sealingly separated from the vacuum chamber and wherein the pneumatic function chamber upon release of the force input element is fluidically connected to the vacuum chamber and sealingly separated from the surrounding atmosphere.

\* \* \* \* \*